United States Patent

Tharmaratnam

[15] 3,665,330

[45] May 23, 1972

[54] TRANSISTOR AMPLIFIER INSENSITIVE TO THE POLARITY OF THE SUPPLY VOLTAGE

[72] Inventor: Poothathamby Tharmaratnam, Nijmegen, Netherlands

[73] Assignee: U.S. Philips Corporation, New York, N.Y.

[22] Filed: July 10, 1970

[21] Appl. No.: 53,940

[30] Foreign Application Priority Data

Nov. 11, 1969 Netherlands ..........6916988
May 20, 1970 Netherlands ..........7007313

[52] U.S. Cl. ..........330/24, 330/30 R, 330/38 M, 330/207 P

[51] Int. Cl. ..........H23f 3/10

[58] Field of Search ..........330/30 R, 38 M, 207 P, 24; 179/1 A; 307/202, 303; 317/235 D

[56] References Cited

UNITED STATES PATENTS

| | | | |
|---|---|---|---|
| 3,043,997 | 7/1962 | Marshall | 330/30 X |
| 3,551,833 | 12/1970 | Hilbert et al. | 330/38 M X |
| 3,505,573 | 4/1970 | Wiedmann | 307/303 X |
| 3,230,429 | 1/1966 | Stehney | 330/38 M UX |
| 3,275,912 | 9/1966 | Kunz | 317/235 D |
| 2,962,603 | 11/1960 | Bright | 307/254 |
| 3,284,677 | 11/1966 | Haas | 307/303 X |

*Primary Examiner*—Roy Lake
*Assistant Examiner*—James B. Mullins
*Attorney*—Frank R. Trifari

[57] ABSTRACT

A transistor amplifier comprising at least two output transistors having their emitters connected together, their collectors connected to different D-C supply voltages and diodes connected across the emitter and collector terminals of each transistor. In accordance with the polarity of the supply voltage, either one of the transistors can be made to cooperate with the diode across the other transistor that is not operating thereby resulting in amplification of an input signal independent of the polarity of the supply voltage. The circuit is suitable for use in integrated circuits.

3 Claims, 4 Drawing Figures

INVENTOR.
POOTHATHAMBY THARMARATNAM
BY
AGENT

Patented May 23, 1972

3,665,330

2 Sheets-Sheet 2

INVENTOR.
POOTHATHAMBY THARMARATNAM
BY
AGENT

TRANSISTOR AMPLIFIER INSENSITIVE TO THE POLARITY OF THE SUPPLY VOLTAGE

The invention relates to a transistor amplifier comprising at least one first transistor whose collector is connected to a first output terminal and whose emitter is connected to a second output terminal, the supply voltage being applied to said output terminals. Such amplifiers are frequently employed, for example, in telephone systems as microphone amplifiers. Each of the two output terminals is then connected to a core of a subscriber line. This subscriber line is through-connected during the transmission of a conversation to a supply bridge which provides the supply voltage of the amplifier. On the one hand the amplified microphone signal is derived from the output terminals and on the other hand the supply voltage is applied to the output terminals via the subscriber line.

In order to render the amplifier insensitive to the supply voltage polarity at the line cores, a diode bridge is frequently arranged between the subscriber line and the output terminals of the amplifier. The diode bridge is formed by the parallel connection of two branches, which are provided between the two output terminals of the amplifier. Each of the two branches includes the series connection of two diodes. The diodes of the two branches connected to the first output terminal are connected to said output terminal by their identical electrodes. Likewise the two other diodes are connected by their identical electrodes to the second output terminal. One core of the subscriber line is connected to the supply point of the two diodes of one branch, whereas the other core of the subscriber line is connected to the junction of the diodes of the other branch. Irrespective of the supply voltage polarity at the said cores the polarity of the supply voltage at the two output terminals will invariably be the same.

The solution described for the problem of rendering the amplifier insensitive to the supply voltage polarity at the cores of the subscriber line has the disadvantage that it involves loss of supply voltage. This loss is due to the fact that irrespective of the polarity of the supply voltage applied to the line cores a conducting diode is always included between one core and one output terminal and between the other core and the other output terminal. A voltage drop occurs across these two diodes. If these diodes are integrated together with the amplifier in a semiconductor body, this voltage drop is about $2 \times 0.9 = 1.8$ V. This means that if the supply voltage of the line cores is equal to E volts the supply voltage applied to the output terminals is equal to $(E - 1.8)$ V. This voltage drop results, for example, in that the permissible cable length of the subscriber line is drastically reduced.

In integrated amplifiers in general an integrated diode bridge may be provided between the supply source and the supply points of the amplifier in order to avoid destruction of the amplifier in the event of erroneous connection of the supply source to said points. This has also the disadvantage that a voltage drop of about 1.8 V will occur, which is often inadmissible.

The invention has for its object to provide a solution for the problem described above and is characterized in that the amplifier comprises a second transistor of the same conductivity type as the first transistor, the emitter of the first transistor being connected via the emitter-collector path of the second transistor to the second output terminal and the base electrodes of the first and second transistors being connected to each other, the signal to be amplified being applied to their junction, while both the emitter and collector of the first transistor and the emitter and collector of the second transistor are connected to each other via a diode, the diode associated with the transistor whose base-collector diode is operative in the forward direction being in the conductive state.

In a preferred embodiment the base electrode of the first transistor is connected via a first series connection of the base-emitter paths of a plurality of transistors to the junction thereof and the base of the second transistor is connected also via a second series connection of the base-emitter paths of a plurality of transistors to the junction thereof, while the collectors of the transistors of the first series connection are connected to the first output terminal and the collectors of the transistors of the second series connection are connected to the second output terminal.

The invention will be described with reference to the drawing.

Figure 1:
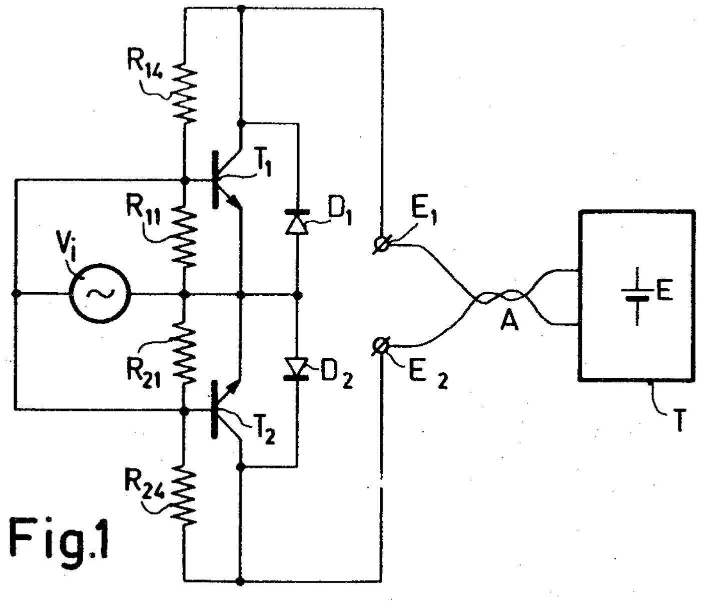
FIG. 1 shows a first transistor amplifier embodying the invention.

Referring to FIG. 1, the collector of the first transistor $T_1$ is connected to the first output terminal $E_1$. The emitter of the first transistor is connected via the emitter-collector path of the second transistor $T_2$ to the second output terminal $E_2$. The base of the first transistor is connected to the base of the second transistor and the signal to be amplified $V_i$ is applied between the junction of the base electrodes of the two transistors and the junction of the emitter electrodes of the two transistors. The collector-emitter path of the first transistor is shunted by the diode $D_1$, which becomes conducting as soon as the base-collector diode of the first transistor $T_1$ becomes conducting or at least receives a bias voltage operating in the forward direction. The collector-emitter path of the second transistor is shunted by the diode $D_2$, which becomes conducting as soon as the base-collector diode of the second transistor becomes conducting or at least receives a bias voltage operating in the forward direction. The output terminals $E_1$ and $E_2$ of the amplifier may be connected via a subscriber line A to a telephone system T, which comprises a supply battery E in series with an output impedance. The battery E supplies the direct supply voltage to the amplifier via the subscriber line A during the call. The base of the transistor $T_1$ is connected via the resistor $R_{14}$ to the output terminal $E_1$, whereas the base of the transistor $T_2$ is connected via the resistor $R_{24}$ to the output terminal $E_2$. The base of the transistor $T_1$ is connected via the resistor $R_{11}$ and the base of the transistor $T_2$ is connected via the resistor $R_{21}$ to the junction of the emitters of the two transistors.

It being supposed that after the connection of the amplifier to the subscriber line A the output terminal $E_1$ is at a positive potential relatively to the output terminal $E_2$, the amplifier shown in FIG. 1 operates as follows: Since $E_1$ is at a positive potential, the transistor $T_1$ and the diode $D_2$ are conducting. A current flows from the output terminal $E_1$ to the output terminal $E_2$ in order of succession through the transistor $T_1$ and the diode $D_2$. This current path includes only one diode $D_2$ so that the voltage loss is restricted to a junction voltage, i.e. that of the diode $D_2$. The presence of the diode $D_2$ in parallel with the emitter-collector path of the transistor $T_2$ provides the additional advantage that the transistor $T_2$ is protected from breakdown. The emitter potential of this transistor is higher than the base potential thereof so that the base-emitter diode is in the cut-off state. Since the break-down voltage of the base-emitter diode of a transistor is usually low, it is necessary to provide a low voltage across the cut-off base-emitter diode. This is achieved by the presence of the diode $D_2$. The voltage drop across the diode $D_2$ may be 0.9 V or less so that the emitter of the transistor $T_2$ relative to the collector thereof is at a voltage of +0.9 V. Since the base-collector diode of the transistor $T_2$ becomes conducting via the resistor $R_{21}$, the voltage between the emitter and the base of the transistor $T_2$ will be equal to $(0.9 - V_{bc})$ V, wherein $V_{bc}$ is the voltage across the conducting base-collector diode. This voltage may be sufficient to render the transistor $T_2$ also conducting so as to convey current in the reverse direction.

In the above description of the operation of the arrangement of FIG. 1 it is assumed that the output terminal $E_1$ is at a positive potential relative to the output terminal $E_2$. It will be obvious that if the output terminal $E_2$ is at a positive potential relative to the output terminal $E_1$ the operation of the arrangement will be the same. Then a current will flow from the output terminal $E_2$ to the output terminal $E_1$ in order of succession through the transistor $T_2$ and the diode $D_1$. The current path includes only the diode $D_1$ so that the voltage loss is again restricted to only one junction voltage ($\approx$0.9V). The diode $D_1$ serves at the same time for protecting the transistor $T_1$.

Figure 2:
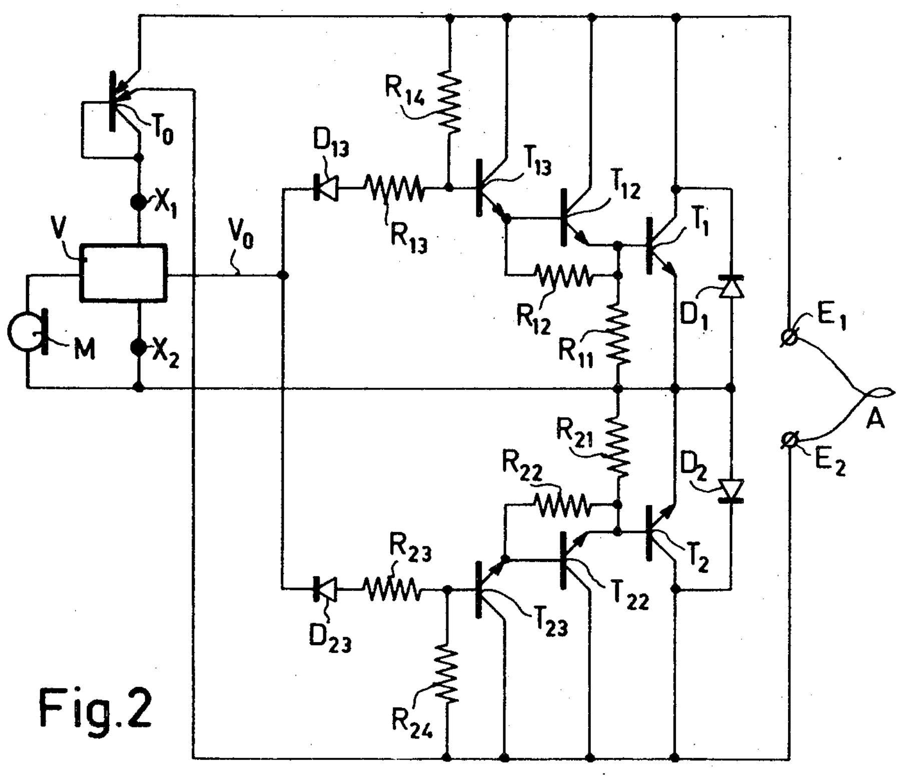
FIG. 2 shows further details of a transistor amplifier embodying the invention.

FIG. 2 shows a further embodiment of the transistor amplifier in accordance with the invention. The base of the first transistor $T_1$ is connected through the series connection of the emitter-base paths of the transistors $T_{12}$, $T_{13}$, the resistor $R_{13}$ and the diode $D_{13}$ to the output $V_o$ of the preamplifier V. The collector electrodes of the two transistors $T_{12}$, $T_{13}$ are directly connected to the first output terminal $E_1$ like the collector of the transistor $T_1$. The emitter of the transistor $T_{13}$ is connected through the resistor $R_{12}$ to the base of the transistor $T_1$, whereas the base of the transistor $T_1$ is connected via the resistor $R_{11}$ to its emitter. The base of the transistor $T_{13}$ is connected via the resistor $R_{14}$ to the first output terminal $E_1$. The base of the second transistor $T_2$ is connected via the series connection of the emitter-base paths of the transistors $T_{22}$, $T_{23}$, the resistor $R_{23}$ and the diode $D_{23}$ to the output $V_o$ of the preamplifier V. The collector electrodes of the two transistors $T_{22}$, $T_{23}$ and directly connected to the second output terminal $E_2$, like the collector of the transistor $T_2$. The emitter of the transistor $T_{23}$ is connected via the resistor $R_{22}$ to the base of the transistor $T_2$, whereas the base of the transistor $T_2$ is connected via the resistor $R_{21}$ to its emitter. The base of the transistor $T_{23}$ is connected via the resistor $R_{24}$ to the second output terminal $E_2$. The emitters of the transistors $T_1$ and $T_2$ are connected to each other and both the emitter and collector of the first transistor $T_1$ and the emitter and collector of the second transistor $T_2$ are each connected through a diode ($D_1$ and $D_2$) respectively to each other. The preamplifier V has two supply points $X_1$ and $X_2$, to which the supply voltage is applied. The supply point $X_2$ is connected to the emitters of the two transistors $T_1$ and $T_2$. The supply point $X_1$ is connected at one end via one collector-emitter path of a multi-emitter transistor $T_o$ to the first output terminal $E_1$ and at the other end via the other collector-emitter path of the multi-emitter transistor $T_o$ to the second output terminal $E_2$, whilst the base of the multi-emitter transistor is connected to its collector.

The arrangement 122 in FIG. 2 operates similarly to that of FIG. 1. If the output terminal $E_1$ is at a positive potential relative to the output terminal $E_2$, the upper amplifier formed by the transistors $T_{13}$, $T_{12}$ and $T_1$ is operating. The lower amplifier formed by the transistors $T_{23}$, $T_{22}$ and $T_2$ is then short-circuited by the then conducting diode $D_2$. The diode $D_{13}$ is then in the conducting state so that the output $V_o$ of the preamplifier stage V is connected to the base-input of the transistor $T_{13}$. The diode $D_{23}$ is in the non-conducting state so that the resistors $R_{23}$ and $R_{24}$ do not load the output $V_o$ of the preamplifying stage. If the output terminal $E_2$ is at a positive potential relative to the output terminal $E_1$, the lower amplifier will be operating and the upper amplifier is not operating. The diode $D_{23}$ is then in the conducting state so that the output $V_o$ of the preamplifier is connected to the base of the transistor $T_{23}$. The diode $D_{13}$ is in the non-conducting state so that it is ensured that the resistors $R_{13}$ and $R_{14}$ do not load the output $V_o$ of the preamplifier. The connection of the supply point $X_1$ via various collector-emitter paths of the multi-emitter transistor to the two output terminals has the advantage that the polarity of the voltage at the supply point $X_1$ is always the same. In this way destruction of the preamplifying stage at a change of polarity of the supply voltage applied to the output terminals is avoided.

The amplifier according to the invention is particularly suitable for use in integrated circuits. This has the advantage that for the diodes $D_1$ and $D_2$ the collector-substrate diodes can be used. Moreover, in the manufacture of integrated circuits it is simpler to make identical or substantially identical transistors so that the amplifications of the upper and lower amplifiers can be accurately equal.

Figure 3:
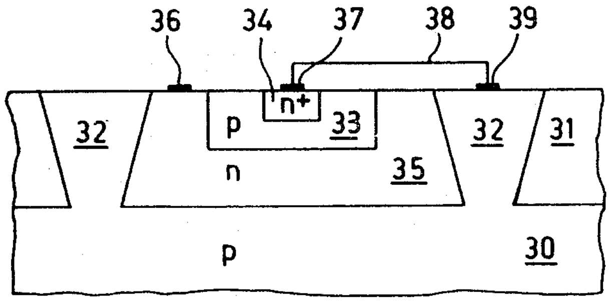
FIGS. 3 and 4 show two lay-outs of semiconductor elements for use in a transistor amplifier as shown in FIGS. 1 or 2.

FIG. 3 shows an embodiment of such a transistor $T_1$ comprising a diode $D_1$. A substrate 30 of p-type conductivity is provided with a thin epitaxial layer 31 of n-type conductivity, in which a conventional manner a p-type separation diffusion zone 32, a p-type base zone 33 and an n-type emitter zone 34 are provided, the remaining island 35 of the epitaxial layer serving as a collector zone. This collector zone 35 is provided with a metal contact 36, which may be deposited, if desired, simultaneously with a contact diffusion of the emitter zone 34, said contact 36 establishing the contact with the electrode 1 (FIGS. 1 and 2). By connecting the emitter contact 37 on the zone 34 via a conductive track 38 to a contact 39 on the separation diffusion zone 32, the pn-junction between the zones 30, 32 and 35 forms said diode $D_1$ in parallel opposition to the emitter-collector path of the transistor formed by the zones 34, 33, 35. By choosing a comparatively large contact 36 it is ensured that the natural series resistance of the diode $D_1$ is at a minimum.

It will be obvious that the transistor $T_2$ may be formed in a similar manner in a second island.

Figure 4:
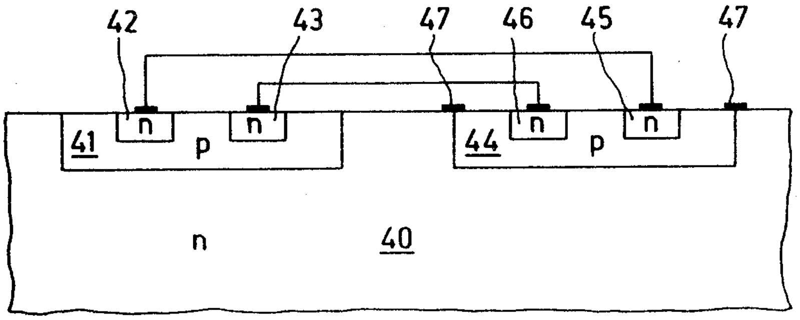

In principle the arrangement of FIG. 1, as shown in FIG. 4, may be obtained without any separation diffusion, for example, by starting from a substrate 40 operating as an emitter, for example, of n-type conductivity, in which p- and n-type zones are diffused in order of succession, the zones 40, 41, 42 form the emitter, base and collector respectively of the transistor $T_1$ and the zones 40, 41, 43 form those of the transistor $T_2$ respectively. The diodes $D_1$ and $D_2$ are formed by the zones 44, 45 and 44, 46 respectively, the zones 42 and 45 and 43, 46 respectively being connected through conductive tracks.

The pn-junction between the zones 44 and 40 is short-circuited at the area of the comparatively large metal contact 47 so that the diodes 44, 45 and 44, 46 respectively are connected at one end to the emitter zone 40 and, moreover, transistor effect of the zones 40, 44, 45 and 40, 44, 46 respectively is avoided. It will be apparent that with this configuration a minimum number of manufacturing operations is required, be it at the expense of the amplification which is then attainable.

What is claimed is:

1. An amplifier insensitive to the polarity of a supply voltage comprising signal input means, first and second transistors of the same type coupled to and amplifying signals received in phase from said input means, first and second output terminals, said first transistor having its collector connected to said first output terminal and its emitter connected to said second output terminal through the emitter - collector path of said second transistor, and first and second diodes connected across the emitters and collectors of said first and second transistors respectively, each diode arranged to conduct when said respective transistor is not operating, said supply voltage being coupled to said output terminals, the polarity of said supply voltage determining the sequence of operation of said transistors.

2. A transistor amplifier circuit as claimed in claim 1 wherein said first and second transistors are coupled to said signal input means through a plurality of transistors, the base of said first transistor being coupled through the base emitter paths of a first series of said plurality of transistors, the base of said second transistor being coupled through the base - emitter paths of a second series of said plurality of transistors, the collectors of said first series transistors being connected to said first output terminal and the collectors of said second series transistors being connected to said second output terminal.

3. A transistor amplifier circuit as claimed in claim 2 further comprising first and second diodes coupling said first and second series transistors respectively to said signal input means.

* * * * *